UNITED STATES PATENT OFFICE.

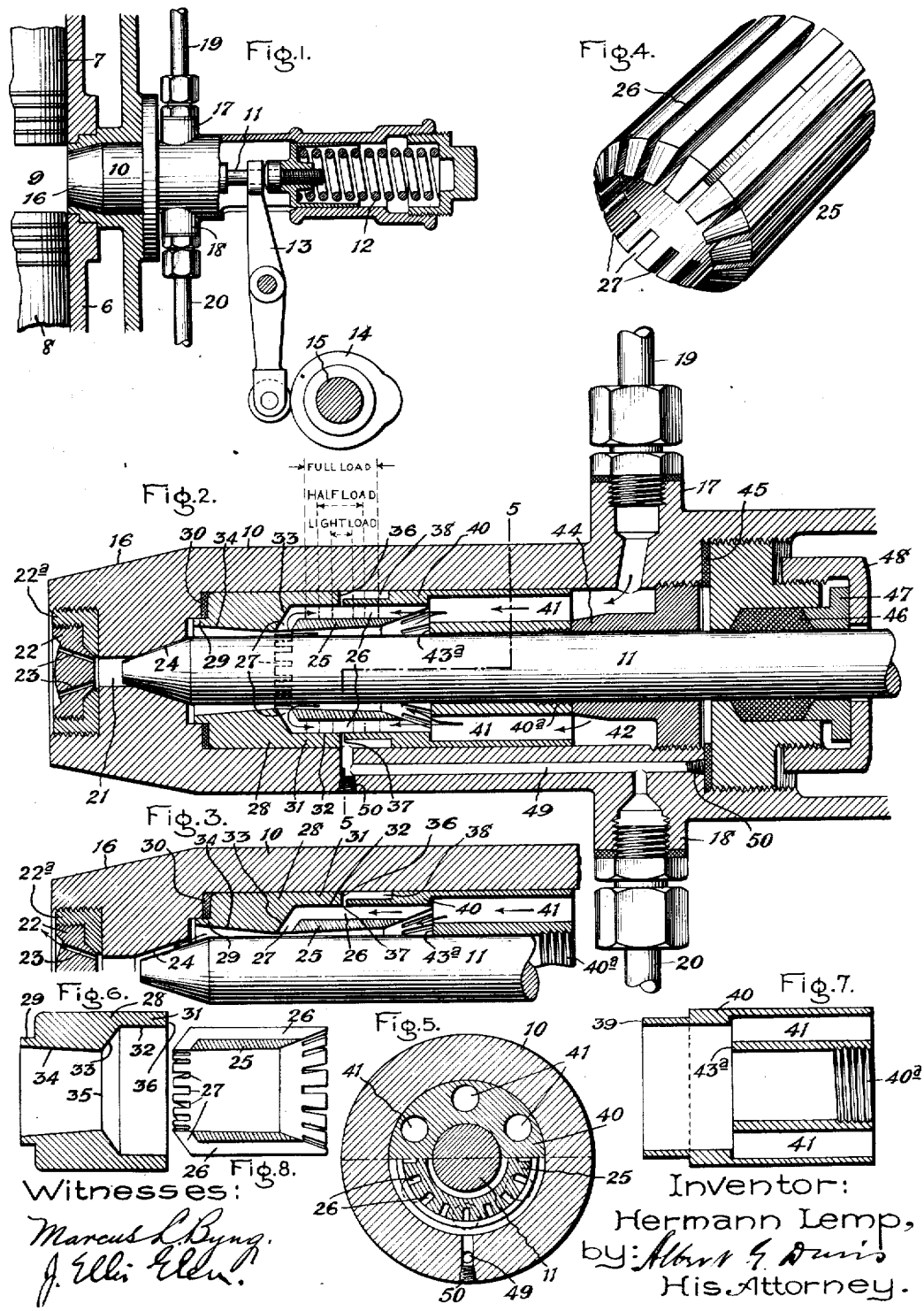

HERMANN LEMP, OF ERIE, PENNSYLVANIA, ASSIGNOR TO GENERAL ELECTRIC COMPANY, A CORPORATION OF NEW YORK.

FUEL-INJECTOR.

1,157,315.   Specification of Letters Patent.   Patented Oct. 19, 1915.

Application filed August 5, 1913. Serial No. 783,143.

*To all whom it may concern:*

Be it known that I, HERMANN LEMP, a citizen of the United States. residing at Erie, county of Erie, State of Pennsylvania, have invented certain new and useful Improvements in Fuel-Injectors, of which the following is a specification.

The present invention relates to so-called injectors, atomizers or pulverizers for introducing fuel, such as crude oil, into the combustion chambers of internal combustion engines and especially to those operating on the high compression cycle. In such latter engines air is compressed in the working cylinder to a temperature above the igniting temperature of the fuel, the latter being injected against the compression pressure by what is commonly known as the air blast. The compression pressure may, as an example, be 450 to 600 lbs. per square inch, and the air blast pressure from 750 to 1,200 lbs. per square inch. Owing to these high pressures the problem of introducing fuel becomes a very difficult one as well as a most important one for the efficiency of these engines is determined chiefly by the action of said injectors.

The principal duty of an injector is to finely divide the fuel and inject the same into the combustion chamber of the engine. Another and also very important duty of the injector is to discharge at each opening of its needle or fuel valve all, or substantially all, of the fuel which it received from the fuel pump during the closed period of the valve. If all of the fuel is not discharged at each opening of the needle valve the amount remaining should be so small as not to cause an abnormal fuel charge to be delivered on the succeeding opening of said valve. My experience is that the more completely the fuel charge is delivered at each opening of the needle valve the better will be the action of the engine and also the regulation. As engines, especially those driving electric generators, sometimes have to pass almost instantly from full load to no load operating conditions and vice versa, the importance of accurately regulating the amount of fuel admitted to the engine on each working stroke and of finely dividing it whether the amount be large or small cannot be over estimated.

The object of my invention is to provide a fuel injector, atomizer or pulverizer which will fulfil the exacting requirements hereinbefore specified, and this in a device which is simple in construction, reliable in operation, and capable of being quickly and easily cleaned.

Another and important object of my invention is to provide an injector which can be used either in a horizontal or vertical position.

A further important feature of my invention is to so arrange the parts that in addition to minutely dividing the fuel, it is sprayed into the combustion chamber in such a manner as to cause as complete combustion as possible.

For a consideration of what I believe to be novel and my invention, attention is directed to the accompanying description and claims appended thereto.

In the drawings which illustrate one of the embodiments of my invention, Figure 1 is a small view showing my improved injector applied to an internal combustion engine; Fig. 2 is a somewhat enlarged longitudinal section of the injector showing the needle valve closed; Fig. 3 is a partial view of the same with the needle valve open, the condition existing when the fuel is being introduced into the combustion chamber of the engine; Fig. 4 is a perspective view of the fuel and air mixer; Fig. 5 is a cross-section taken on line 5—5 of Fig. 2; Fig. 6 is a sectional view of the seat; Fig. 7 is a sectional view of the guide; and Fig. 8 is a sectional view of the mixer.

6 indicates the cylinder of an internal combustion engine operating on the high compression plan. As shown it is provided with two oppositely moving pistons 7 and 8 which are suitably connected to the main shaft by rods. The cylinder may be horizontal or vertical or at an inclination to the horizontal as desired. It may have two pistons as shown or only a single piston as is common with many engines. Situated in such position that it will properly discharge fuel into the combustion space 9 is the fuel injector. It is provided with a casing 10 that is seated pressure tight in the outside cylinder wall and liner. The injector is provided with a needle valve 11 that is normally held closed by the coiled spring 12. Engaging a collar on the valve spindle is a lever 13, the lower end of which is moved in the direction to open the valve at the proper time by the cam 14. The cam is mounted on a shaft 15 and the latter is driven in any suitable manner from the main shaft. As shown the engine is of the two cycle type but it can just as well operate on any other cycle by properly timing the opening and closing of the fuel valve and suitably arranging the cylinder ports.

Referring to Fig. 2, 10 indicates the casing or body of the injector which is provided with a conical end 16 to permit of its being seated pressure tight in the cylinder wall, liner or cylinder head as the case may be. It is also provided with two bosses 17 and 18 which are threaded to receive the pipes 19 and 20, the former conveying compressed air and the latter fuel under pressure from a suitable source of supply, such as a pump for example. The interior of the casing is bored out to form an outlet 21 for fuel and air in a finely divided state, and also to form a recess to receive the flame plate 22. This plate may have one, two or more holes 23 through which the mixture passes. It is preferable to use two or more holes and to incline them at an angle so that the mixture will tend to spread out like a fan or cone. The flame plate may be mounted directly in the casing or it may be mounted in a holder 22ª which is threaded into the casing as shown. The casing is also provided with a conical valve seat 24 to receive the tapered end of the valve.

The casing contains an enlarged central bore and located therein is a mixer 25, Fig. 4, comprising a tubular cylindrical body surrounding the needle valve and having a plurality of parallel and longitudinally extending peripheral fuel-receiving grooves or passages 26 and also end grooves or passages 27 that register with and form inclined continuations of the peripheral passages or grooves 26. The grooves 27 are all directed toward a common point located in the axis of the needle valve so that as the blast air rushes forward through said grooves into the combustion chamber it will carry fuel with it. The grooves 26 and 27 are relatively small in cross-section and are quite numerous so that a relatively large number of small fuel bodies or slugs will be held therein. On the other hand the cross-section should be great enough so as not to offer any substantial resistance to the passage of fuel and air. They should also be made large enough so that they may be easily machined, and also large enough so that they may be readily cleaned in case they become clogged for any reason. The size will also depend somewhat upon the viscosity of the fuel, it being somewhat greater for heavy fuels than for light. It is also highly desirable to make a relatively large number of peripheral grooves or passages 26 so that the fuel for each charge, whether it be large or small, is divided into a number of small bodies as distinguished from a single and relatively large body. This assists in the final minute subdivision of the fuel charge which is so important in a device of this kind. Furthermore by sub-dividing each charge and having a column of air or other elastic fluid act on each part of the total measured charge, said charge as a whole will with certainty be driven out when the valve opens. By the symmetrical arrangement of the grooves 26 and 27 about the axis of the valve as shown they will each contain substantially the same amount of fuel, which amount is only a fraction of the whole charge. Thus it will be seen that the subdivision of the fuel is begun at a time prior to the action of the air thereon. I have shown the passages 26 and 27 both made in the form of slots or grooves because this is the easiest and most accurate way to make them, but in so far as the principle of operation of my invention is concerned they might be made in a different manner. I have referred to the passages or grooves 26 and 27 separately for the sake of convenience of description, but in effect each pair of grooves 26 and 27 forms a continuous passage, one end of which is bent at an angle to convey fuel into the Venturi throat. These passages are also made straight and parallel to each other but they need not necessarily be so arranged. The cross-sectional area of each passage should be sufficiently great to permit the blast air to easily drive the fuel before it, but on the other hand it should not be too deep or too large in cross-section since this will give rise to irregularities when the engine is running at light loads due to the fact that the blast air will not necessarily clean out all the fuel in the passage. To state the matter in another way the best results will be obtained if each passage is of such size that even at light loads it will be completely filled for a portion of its length. For greater loads the cross-section of each fuel body will of course remain the same but its length will be greater, said increase being determined by the amount delivered by the fuel pump.

In front of the mixer is a seat of the form best shown in Fig. 6. It comprises an annular member 28 which is provided with a lip 29 at its forward end that engages a shoulder on the casing. Between the end of the seat and the shoulder on the casing is a packing 30 of any suitable form. The seat is provided with a portion 31 containing a counter-bore 32 whose diameter is such as to permit one end of the mixer 25 to fit snugly therein. It is also provided with a tapered wall 33 upon which the projections between the end grooves 27 of the mixer rest. Thus it will be seen that the tapered wall 33 forms the outer wall of the inclined grooves 27 and the wall of bore 32 the outer wall of the left-hand ends of the peripheral grooves 26. In addition to this the seat is provided with a diverging bore 34 forming one part of a Venturi device, the purpose of which is to obtain a drop in pressure. As is well understood a Venturi device, or tube as they are commonly called, comprises a converging portion, a throat, and a diverging portion. In such a device, as the cross-sectional area decreases the velocity increases accompanied by a drop in pressure which reaches its maximum at the throat. From the throat as the cross-sectional area increases the velocity decreases and the pressure increases to substantially its original value. I make use of this peculiarity of a Venturi device to obtan a drop in pressure, and so position the parts that the throat or region 35 of lowest pressure and highest velocity registers as closely as possible without undue mechanical complication with the discharge ends of the inclined grooves 27. The converging part of the Venturi device is formed in the mixer 25. From Figs. 2 and 3 it will be seen that the bore of the mixer, which is somewhat larger than the stem of the valve, gradually decreases in cross-sectional area from the inlet end to the end which engages the seat so that the region of greatest restriction, or throat, registers with the inclined ends of the grooves 27. The amount of the convergence and divergence of the Venturi device with respect to the throat will naturally vary somewhat with the air blast and compression pressures but in general it may be stated that the drop in pressure at the throat should be great enough to cause the superior air pressure in the grooves 26 existing when the valve is opened to drive out the fuel contained therein into and through the grooves 27. The cylindrical end 36 of the seat also forms one wall of a capillary passage or conduit means 37 which, while it permits fuel to be forced through it by a pump or equivalent means under high or relatively high pressure, prevents the free flow of fuel therethrough. In other words, this capillary conduit is interposed between a supply chamber 38 of suitable size where more or less fuel may collect and the fuel grooves 26 in the mixer and from which the fuel is substantially cleaned out each time the needle valve is opened and high pressure air rushes therethrough. The other wall 39 of the capillary conduit is formed on the guide member 40, the construction of which will be described later. Although the capillary conduit is illustrated as being annular and therefore continuous, its effect is similar to a series of small conduits, each of which delivers fuel to a single groove 26. This is due to the fact that the periphery of each wall between the grooves in the mixer engages the seat 28 on the one side and the guide member 40 on the other. In so far as the principle of operation of my invention is concerned it makes no difference whether one or a number of capillary conduits are formed between the seat and mixer, but from the point of view of the construction it is much better to use a single conduit as shown because it is much simpler to make and is easier to clean. Also the seat need not be made separate from the casing, but it is much better from a manufacturing point of view to make it so, as the machining of the diverging end of the Venturi device and of the valve seat 24 is simplified thereby. By forming the walls of this annular capillary conduit on separate parts and making shoulders on the seat and guide which engage the mixer, I am able in the first place to make the passage of the exact desired size without difficulty. That is to say, as each part is machined separately it is a simple matter to make them to exact size. On the other hand if this conduit had to be cut out of an integral piece it would be a rather difficult operation and one requiring more than usual care and skill. Furthermore by forming it between individual pieces the conduit can be readily cleaned by separating the parts.

By the term "capillary passage" is meant one whose walls are so close together at some point, giving due consideration to the viscosity of the fuel, that they serve to prevent the fuel from flowing by gravity from the source of supply to the passages or grooves in the mixer. In other words, the restriction is such that fuel can only be forced through it by the utilization of considerable pressure. Looking at the matter in another way, the function of the capillary passage or conduit is to restrict the amount of fuel delivered to the passages to that which is displaced from the supply chamber by the pump on each working stroke. The resistive action of the capillary conduit is assisted in a measure by the air pressure within the injector acting between the time of closing of the fuel valve and the working stroke of the fuel pump.

The member 40 comprises an annular portion having a cylindrical central bore, the wall of which acts as a guide for the valve stem and holds it in proper alinement. One end is threaded as at 40$^a$ to receive a withdrawing tool. It is also provided with air passages 41 which, in the present illustration, take the form of longitudinal holes, of which six are shown, that are open at both ends. At the right these passages communicate with a chamber 42 that receives compressed air from the pipe 19. At the left the passages open in the peripheral grooves 26 and also into the beveled or cut-away end of the converging portion of the Venturi device, the direction of flow of the air being indicated by arrows. The member 40 also surrounds the mixer at one end and forms the outer wall of the peripheral grooves 26 thereof. Viewed from one point the mixer is in telescopic relation with the seat and member, each part serving to partially cover it. By making the mixer slightly longer than the distance between the inclined wall 33 of the seat and the shoulder 43ª of the member 40 the capillary conduit 37 is formed without extra machine operation and its width can be determined with great exactness.

The left-hand end of the guide member 40 is cut away to form the fuel supply chamber 38, the outer wall of which is formed by the inner wall of the main casing. As a result of this I avoid having to make an internal chamber in the casing which is a rather difficult thing to make satisfactorily, although my invention is not limited thereto unless so specified in the claims. The guide is held in place by a follower 44 which is screw-threaded into the casing. Beyond the follower is an externally threaded nut which is seated on a packing 45 to prevent the escape of high pressure air. In the nut is packing material 46 around the valve stem which is compressed by a gland 47 and nut 48.

Extending longitudinally of the casing is a fuel conveying passage or conduit 49 which communicates with a short perpendicular passage leading to the supply chamber 38. The idle ends of these passages are closed by screw-threaded plugs 50. Fuel under high pressure is admitted to the passage by the conduit 20 from a pump or other source of supply. This pressure is superior to the air blast pressure and the latter is superior to the compression pressure in the engine cylinder.

The action of my improved injector is as follows: Previous to each opening of the needle valve an amount of fuel determined by the governor, or hand controlled device in some cases, is delivered by the pump to the passage 49 and supply chamber 38, and from the latter a certain amount determined by the action of the pump is forced through the capillary passage 37 into the peripheral grooves 26. As an example the fuel thus introduced may occupy the space between the lines marked "light load", "half load", "full load", in each groove, or some region intermediate said lines. At this instant air under equal pressures acts on each end of the relatively small fuel bodies in the peripheral grooves. If now the fuel valve 11 is opened by the cam or other means, the high pressure air begins to flow through the passage 21 and flame plate into the combustion chamber. As soon as this takes place, air being supplied in sufficient quantity for the purpose rushes through the Venturi device and a drop in pressure takes place at the throat and at the ends of the inclined grooves 27. As a result of this the superior air pressure in the peripheral grooves 26 back of the small fuel bodies forces each one of them forward and down through the end grooves 27 where they meet the rapidly moving air floating through the main central orifice. The meeting of the fuel and rapidly moving air causes the latter as it were to tear minute particles of fuel from said small bodies and carry them into the passage 21 and thence into the combustion chamber. A somewhat analogous action taken from the mechanical arts would be that of a rapidly moving file acting to cut off small particles of the work as it moved forward.

It will be noted that the compressed air has two paths starting at the member 40, a main path through the central openings in the mixer and seat and a shunt path through the grooves in the mixer where the fuel is started into motion and delivered to the more rapidly moving air of the main path where it is further and minutely divided.

I have described my invention in connection with engines arranged to automatically ignite the fuel charge as soon as it is introduced into the combustion chamber due to the high temperature of the air or gas therein but it can also be used advantageously with engines operating with lower compression where fuel igniting devices are provided.

From actual tests made with my improved injector I have found that the fuel is divided very minutely thereby and that the same is effectively burned in the combustion space thereby materially increasing the efficiency of the engine.

I have referred to compressed air as being the medium for conveying the fuel into the engine but it is to be understood that other gases may be used for the purpose.

The Venturi device is shown as being formed by the seat and mixer because it simplifies the construction and reduces the number of parts but physically they need not be so formed.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a fuel injector, the combination of a casing, an outlet therefor, a valve controlling the outlet, a mixer located in the casing which is provided with an opening larger than the valve and through which it passes, a plurality of individual and longitudinally extending passages in the mixer, each arranged to receive a portion of the fuel charge, said passages communicating at one end with the central opening and at the other end with a supply of elastic fluid, a conduit supplying elastic fluid under pressure to the opening and to the passages, a fuel supply chamber, a conduit delivering fuel thereto, and an annular capillary conduit means receiving fuel from the chamber and delivering it directly to all of the passages against the pressure therein, said means also serving to prevent the flow of fuel from the chamber by gravity.

2. In a fuel injector, the combination of a casing, an outlet therefor, a valve controlling the outlet, a mixer which surrounds the valve, is separated therefrom by a fluid carrying space and has a number of longitudinally extending fuel passages opening into said space, a fuel supply chamber, capillary conduit means which receive fuel from the chamber and deliver it in the form of small bodies to each of the passages where it is exposed on both ends to elastic fluid pressure, the cross-sectional area of each of the passages being greater than that of the portion of the conduit means directly admitting fuel thereto, a conduit for supplying elastic fluid to said space and to the passages, and a conduit supplying fuel to the supply chamber under a pressure greater than that of the elastic fluid.

3. In a fuel injector, the combination of a casing, an outlet therefor, a valve controlling the outlet, a mixer in the casing which has a main passage for elastic fluid and a plurality of individual smaller passages in shunt relation thereto and communicating therewith at both ends, each being arranged to receive and temporarily hold a portion of the fuel charge, a fuel supply chamber, a capillary conduit means for conveying fuel from the chamber and delivering a portion of it to said shunt passages, said conduit means being adapted to prevent the free flow of fuel into the passages, and a conduit for supplying fuel under pressure to the chamber and forcing regulated amounts therefrom through said means.

4. In a fuel injector, the combination of a casing, an outlet therefor, a valve controlling the outlet, a seat in the casing which surrounds the valve, a member which surrounds the valve and contains passages for elastic fluid, a mixer that is held at its ends by the seat and member and is provided with numerous and independent fuel receiving passages that are open at both ends, a cut-away portion of the periphery of the member forming a fuel supply chamber, an annular capillary conduit means which receive fuel from the chamber and deliver a portion of it to each of the passages, and a conduit for supplying fuel under sufficient pressure to the chamber to force fuel from the chamber through said means.

5. In a fuel injector, the combination of a casing, an outlet therefor, a seat in the casing which has a bore that diverges toward the outlet, a mixer which has a plurality of individual open ended fuel passages that communicate at one end with the smaller part of said bore, said mixer having a bore that gradually converges toward the seat, a member that contains passages for conveying elastic fluid to the fuel passages and to said bore, and which surrounds the mixer to form the outer walls of its fuel passages, a valve that passes through the seat, mixer and member, and controls the outlet, a cut-away portion in the periphery of the member forming a fuel supply chamber, the outer wall of which is formed by the casing, a conduit means receiving fuel from the chamber and delivering a portion of it to each of said passages, and conduits for supplying elastic fluid to said passages and bores and fuel to the chamber.

6. In a fuel injector, the combination of a casing, an outlet therefor, a seat in the casing that is provided with a central orifice, a member that is provided with a central orifice and elastic fluid conveying passages, a mixer which is in telescopic relation with the seat and member and is provided with individual and longitudinally extending open ended fuel receiving grooves, a fuel supply chamber in the member whose outer wall is formed by the casing, capillary conduit means conveying fuel from the chamber to each of the grooves which also prevent the flow of fuel by gravity from the chamber, a conduit supplying elastic fluid to said orifices and to the grooves in the mixer, a conduit for supplying fuel under pressure to the chamber, and a valve that controls the passage of fluid through the outlet.

7. In a fuel injector, the combination of a casing, an outlet therefor, a mixer which has a central orifice, longitudinal peripheral grooves and registering end grooves, a seat that has a central orifice and walls that engage the end and peripheral projections between the grooves and form a closure therefor, a member that has fluid passages, a central orifice, a shoulder which engages one end of the mixer and a cylindrical part that forms a closure for said peripheral grooves for a portion of their length, there being a conduit formed between the adjacent ends of the seat and member, a fuel supply chamber in communication with the conduit, a conduit supplying fuel under pressure to the chamber, and a conduit supplying elastic fluid under pressure to the passages in the member and said orifices.

8. In a fuel injector, the combination of a casing, an outlet therefor, a seat in the casing that is provided with an orifice diverging toward the outlet and walls that partially embrace the mixer, a mixer which has an orifice that converges toward the outlet, and which also has end and peripheral grooves that are partially covered by the walls of said seat, a member which acts as a guide for the valve, said member being provided with air passages, and also a shoulder that engages one end of the mixer, and also with an annular wall that forms a closure for the grooves for a portion of their length, there being a capillary passage between the adjacent ends of the annular walls of the seat and member, a fuel chamber formed between the casing and member that communicates with the capillary passage, a conduit conveying fuel to the chamber under a pressure sufficient to force it through the passage, a conduit for conveying air to the orifices and to air and fuel passages under a pressure greater than the compression pressure of the engine, a follower engaging the member, a valve that passes through the follower, member, mixer and seat and engages a seat on the casing.

9. In a fuel injector, the combination of a casing, an outlet therefor, a seat in the casing which has a central bore, a beveled shoulder, and a cylindrical portion, a cylindrical mixer arranged in telescopic relation with respect to said cylindrical portion and which engages said beveled shoulder at one end, said mixer having peripheral and end projections with fuel receiving grooves between, a member which holds the mixer against the shoulder and also incloses one end thereof and forms an outer wall of said grooves, there being a capillary passage means between one end of the seat and the member through which fuel from the supply chamber enters the individual grooves, said passage means being located between the ends of the longitudinal grooves, a supply chamber which communicates with the capillary passage means, the latter acting to prevent the flow of fuel by gravity from the chamber, means supplying fuel to the chamber, a valve which passes through the seat, mixer, and member, and controls the passage of fuel from the casing, and a conduit admitting compressed air to the casing to force fuel through the grooves and through the central bore in the seat.

10. In a fuel injector, the combination of a casing, an outlet therefor, a seat in the casing having a central bore, an annular member also located in the casing which has through passages for compressed air, the adjacent ends of the seat and member defining a capillary fuel passage, a cut-away portion in the member which forms two walls of a fuel supply chamber, the remaining walls being formed by the seat and the casing, a cylindrical mixer which is located between the seat and member and is inclosed thereby, said member having longitudinal peripheral grooves and also end grooves opening into said bore, said longitudinal grooves receiving fuel from the supply chamber through the capillary passage, a valve controlling the outlet, a conduit in the casing supplying fuel under pressure to the chamber, and a conduit supplying compressed air to said bore and grooves to force fuel through the outlet.

In witness whereof, I have hereunto set my hand this 4th day of August, 1913.

HERMANN LEMP.

Witnesses:
BENJAMIN B. HULL,
HELEN ORFORD.

It is hereby certified that in Letters Patent No. 1,157,315, granted October 19, 1915, upon the application of Hermann Lemp, of Erie, Pennsylvania, for an improvement in "Fuel-Injectors," an error appears in the printed specification requiring correction as follows: Page 4, line 75, for the word "floating" read *flowing;* and that the said Letters Patent should be read with this correction therein that the same may conform to the record of the case in the Patent Office.

Signed and sealed this 9th day of November, A. D., 1915.

[SEAL.]

J. T. NEWTON,

*Acting Commissioner of Patents.*